(12) United States Patent
Sawafuji

(10) Patent No.: US 12,725,627 B2
(45) Date of Patent: Sep. 1, 2026

(54) INFORMATION PROCESSING APPARATUS, INFORMATION PROCESSING METHOD, PROGRAM AND RECORDING MEDIUM

(71) Applicant: PIONEER CORPORATION, Tokyo (JP)

(72) Inventor: Keigo Sawafuji, Tokyo (JP)

(73) Assignee: PIONEER CORPORATION, Tokyo (JP)

( * ) Notice: Subject to any disclaimer, the term of this patent is extended or adjusted under 35 U.S.C. 154(b) by 128 days.

(21) Appl. No.: 18/838,039

(22) PCT Filed: Feb. 13, 2023

(86) PCT No.: PCT/JP2023/004684

§ 371 (c)(1),
(2) Date: Aug. 13, 2024

(87) PCT Pub. No.: WO2023/157783

PCT Pub. Date: Aug. 24, 2023

(65) Prior Publication Data

US 2025/0149054 A1 May 8, 2025

(30) Foreign Application Priority Data

Feb. 16, 2022 (JP) ................................ 2022-021996

(51) Int. Cl.
*G10L 21/0364* (2013.01)
*G01C 21/36* (2006.01)
(Continued)

(52) U.S. Cl.
CPC .......... *G10L 21/0364* (2013.01); *G01C 21/36* (2013.01); *G10L 15/08* (2013.01);
(Continued)

(58) Field of Classification Search
CPC ..... G10L 21/0364; G10L 15/08; G10L 15/22; G10L 21/034; G10L 25/84;
(Continued)

(56) References Cited

U.S. PATENT DOCUMENTS 8,938,081 B2 * 1/2015 Goerke .................... H03G 3/32 381/104
8,990,079 B1 * 3/2015 Newman ................ G10L 25/93 704/214
(Continued)

FOREIGN PATENT DOCUMENTS

JP 2002-91488 A 3/2002
JP 2006-194633 A 7/2006

OTHER PUBLICATIONS

International Search Report issued in PCT/JP2023/004684 mailed on Apr. 11, 2023 with English Translation (5 pages).
(Continued)

*Primary Examiner* — Thuykhanh Le
(74) *Attorney, Agent, or Firm* — Nakanishi IP Associates, LLC

(57) ABSTRACT

An information processing apparatus controls volume so that a user can reliably hear voice guidance and other audio without auditory discomfort and with certainty. A noise detector detects a noise level in a vehicle interior collected in a sound collector, and a command speech detector detects whether it is a command speech period, which is a period from detection of a wake-up word from the user's speech sound to the detection of user's command speech. A volume controller, which sets volume of sounds to be output to the user based on the noise level when the noise level is not detected during the command speech period, and does not
(Continued)

set the volume of the sounds based on the noise level when the noise level is detected during the command speech period.

11 Claims, 10 Drawing Sheets

(51) Int. Cl.

| | |
|---|---|
| ***G10L 15/08*** | (2006.01) |
| ***G10L 15/22*** | (2006.01) |
| ***G10L 21/034*** | (2013.01) |
| ***G10L 25/84*** | (2013.01) |

(52) U.S. Cl.

CPC ............ *G10L 15/22* (2013.01); *G10L 21/034* (2013.01); *G10L 25/84* (2013.01); *G10L 2015/088* (2013.01); *G10L 2015/223* (2013.01)

(58) Field of Classification Search

CPC ......... G10L 2015/088; G10L 2015/223; G10L 25/21; G01C 21/36; G01C 21/3629; G06F 3/165; G06F 3/167; H03G 3/32

USPC ........................................................... 704/225

See application file for complete search history.

(56) References Cited

U.S. PATENT DOCUMENTS 9,584,653 B1* 2/2017 Lyren ................ H04M 1/72469
10,674,265 B1* 6/2020 Lee .......................... H04R 5/04
10,740,064 B1* 8/2020 Reddy .................. G11B 27/031
2009/0304191 A1* 12/2009 Hoang Co Thuy .......................... G10L 21/0208 381/57
2012/0008802 A1* 1/2012 Felber ..................... G10L 15/22 704/233
2014/0016791 A1* 1/2014 Smith ...................... H03G 3/32 381/57
2014/0309997 A1* 10/2014 Hanyu ..................... H03G 3/32 704/258
2014/0337018 A1* 11/2014 Samuel .................. H03G 5/165 704/205
2016/0036962 A1* 2/2016 Rand ....................... G06F 3/165 455/418
2016/0104479 A1* 4/2016 Bloomer ................. G10L 15/08 704/254
2016/0148623 A1* 5/2016 Yamanashi ........... G10L 21/028 725/116
2016/0150124 A1* 5/2016 Panda ................... G06F 3/1238 358/1.14
2016/0163330 A1* 6/2016 Ida ...................... G10L 21/0208 381/10
2016/0210983 A1* 7/2016 Amada ................. G10L 21/034
2016/0260445 A1* 9/2016 Duwenhorst ....... G06F 3/04847
2017/0011753 A1* 1/2017 Herbig ................. H03G 3/3089
2017/0126192 A1* 5/2017 Fu ............................ H03G 3/32
2018/0309421 A1* 10/2018 Smith .................. H03G 3/3005
2019/0227767 A1* 7/2019 Yang ................... H04M 1/6016
2019/0267020 A1* 8/2019 Kim ...................... G10L 21/034
2019/0311718 A1* 10/2019 Huber ..................... G10L 15/22
2019/0385634 A1* 12/2019 Traynor .................. G10L 25/18
2020/0034108 A1* 1/2020 Mozer ..................... G06F 3/167
2020/0075036 A1* 3/2020 Shin ........................ G10L 25/78
2020/0154202 A1* 5/2020 Raja Gunaseela Boopathy .......... H03G 9/025
2020/0160854 A1* 5/2020 Suzuki .................... G10L 15/22
2020/0260186 A1* 8/2020 Stachura ................. G10L 15/30
2020/0312316 A1* 10/2020 Kano ...................... G10L 15/20
2021/0026592 A1* 1/2021 Park ........................ G06F 3/165
2021/0043205 A1* 2/2021 Lee .......................... G10L 15/22
2021/0067119 A1* 3/2021 Gadde ..................... G10L 17/00
2021/0132897 A1* 5/2021 Song ....................... G06F 3/165
2021/0168247 A1* 6/2021 Ikeda ................. H04N 1/00403
2021/0203295 A1* 7/2021 Mahadeva ............... H03G 3/32
2021/0225388 A1* 7/2021 Zhang ................. G10L 21/0232
2021/0264916 A1* 8/2021 Kim ...................... G10L 15/075
2021/0287691 A1* 9/2021 Rudberg ............. G10L 21/0208
2022/0020359 A1* 1/2022 Vitzrabin .................. G06F 3/14
2022/0020386 A1* 1/2022 Vanapalli ............ G10L 21/0208
2022/0058378 A1* 2/2022 Ann ........................ G06F 3/167
2022/0141587 A1* 5/2022 Chen ....................... G06F 3/165 381/17
2022/0198994 A1* 6/2022 Yang ....................... G06F 3/005
2022/0294405 A1* 9/2022 Lee ........................ H03G 5/165
2022/0391163 A1* 12/2022 Bai ....................... H04M 1/725
2022/0415362 A1* 12/2022 Jang ...................... G06F 16/685
2023/0010466 A1* 1/2023 Port .................... G10L 21/0364
2023/0385017 A1* 11/2023 Soto ........................ G06F 3/165
2023/0419984 A1* 12/2023 Uhle ....................... G10L 25/48
2024/0192916 A1* 6/2024 Law ........................ G06F 3/165
2024/0339114 A1* 10/2024 Sunaga ................... G10L 15/08

OTHER PUBLICATIONS

Written Opinion of the International Searching Authority issued in PCT/JP2023/004684 mailed on Apr. 11, 2023 with English Translation (5 pages).

* cited by examiner

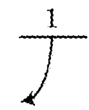
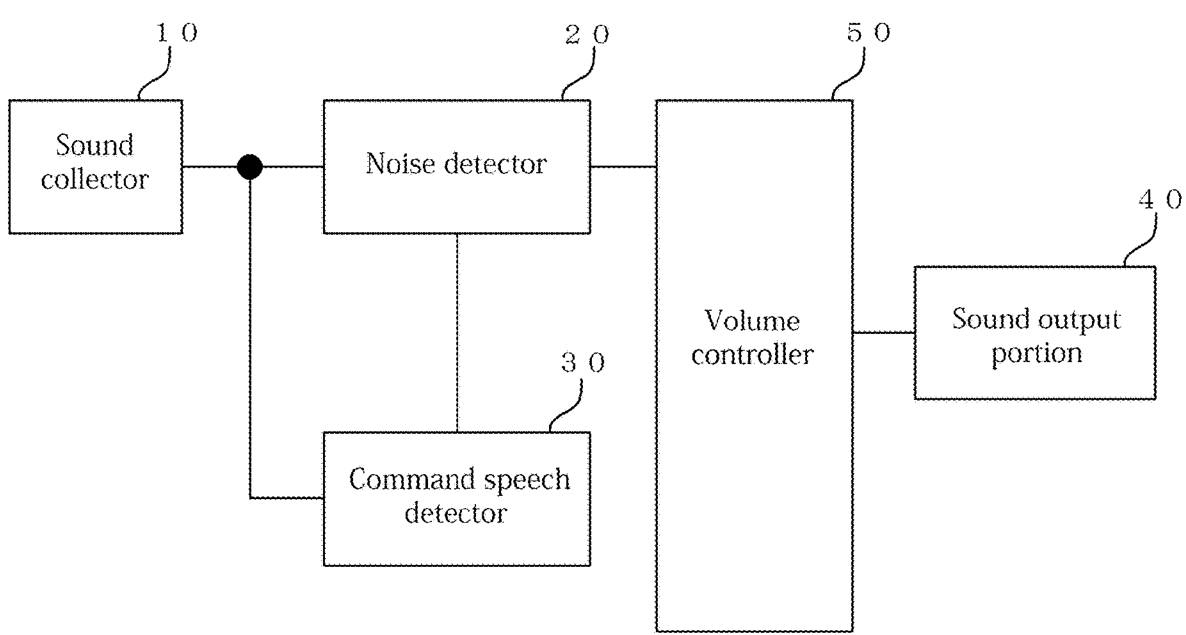
Fig. 1

Fig. 2

| Noise level acquired from noise detector 20 | Volume correction value |
|---|---|
| Greater than 70 dB | +12 dB |
| 70dB or less | +9 dB |
| 65dB or less | + 6 dB |
| 60dB or less | 0 dB |

Fig. 4

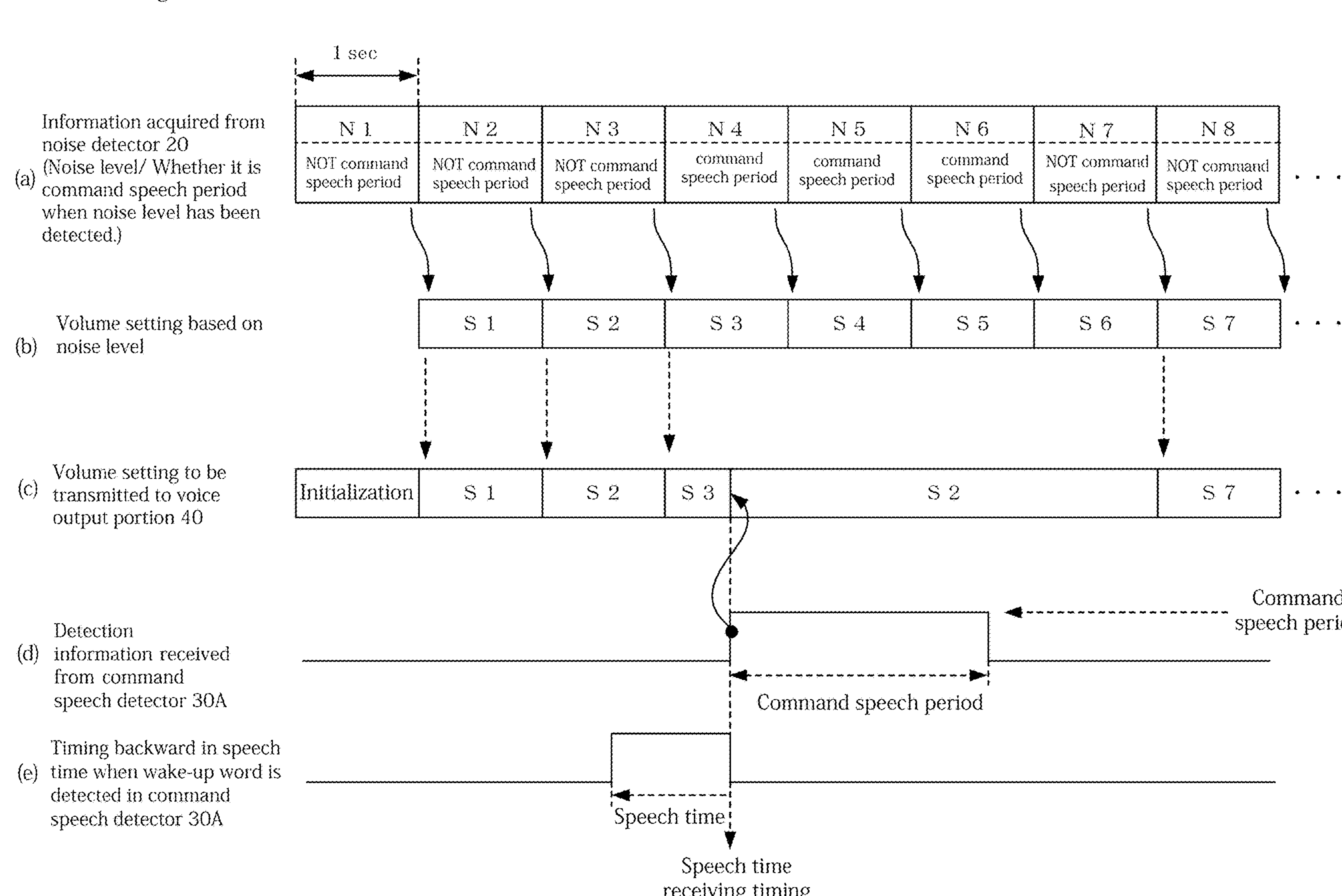
Fig . 6
1 sec
(a) Information acquired from noise detector 20 (Noise level/ Whether it is command speech period when noise level has been detected.)
N 1
NOT command speech period
N 2
NOT command speech period
N 3
NOT command speech period
N 4
command speech period
N 5
command speech period
N 6
command speech period
N 7
NOT command speech period
N 8
NOT command speech period
(b) Volume setting based on noise level
S 1
S 2
S 3
S 4
S 5
S 6
S 7
(c) Volume setting to be transmitted to voice output portion 40
Initialization
S 1
S 2
S 3
S 2
S 7
(d) Detection information received from command speech detector 30A
Command speech period
Command speech period
(e) Timing backward in speech time when wake-up word is detected in command speech detector 30A
Speech time
Speech time receiving timing

INFORMATION PROCESSING APPARATUS, INFORMATION PROCESSING METHOD, PROGRAM AND RECORDING MEDIUM

TECHNICAL FIELD

The present invention relates to an information processing apparatus, an information processing method, a program and a recording medium.

BACKGROUND ART

In general, a navigation apparatus provides a voice guidance to guide a user along a route to a destination set by the user, including preliminary route information on a next intersection to turn and traffic congestion information on road to be traveled.

In this type of device, the voice guidance is provided at volume selected by the user from among several predetermined volume levels. However, the user may not be able to hear the voice guidance or may misrecognize the guidance due to a noise level caused by a road noise or an engine noise during driving.

Here, a technology has been disclosed for controlling volume of the voice guidance based on the noise level inside and outside a vehicle so that the user can hear the voice guidance even in noisy driving conditions (see, for example, Patent Literature 1).

In the prior art mentioned above, it is proposed to detect loudness of noise generated inside and outside the vehicle using a microphone disposed inside the vehicle, and to control the volume of the voice guidance based on the loudness of the noise.

RELATED ART LITERATURE

Patent Literature

Japanese Unexamined Patent Application Publication No. 2002-91488

SUMMARY OF INVENTION

Technical Problem

In recent years, a device in which a voice assistant function is activated by a user speaking a wake-up word (also called a wake word or hot word) and the user gives operating instructions and information retrieval, for example, to the device through user's speech have become popular.

In a case of a navigation apparatus with the voice assistant function as described above, voice spoken by the user to give the operating instructions, for example, is captured as a noise and the volume of the voice guidance is controlled. This can cause the voice guidance to be output at high volume or the volume of the voice guidance to change in a middle of output, making it difficult to hear the voice guidance.

The present invention has been made in view of the problems mentioned as one example above, and it is a principal object of the present invention to provide an information processing apparatus, an information processing method, a program, and a recording medium that control the volume so that the user can hear the voice guidance and other sounds without auditory discomfort and with certainty.

Solution to Problem

The invention according to claim 1 is an information processing apparatus comprising: a noise detector that detects a noise level in a vehicle interior; a command speech detector that detects whether it is a command speech period, which is a period of time between detection of a wake-up word from a user's speech sound and the detection of user's command speech; and a volume controller that sets volume of sounds output to the user based on the noise level when the noise level is not detected during the command speech period and does not set the volume of the sounds based on the noise level when the noise level is detected during the command speech period.

The invention according to claim 7 is an information processing method including a noise detector, a command speech detector and a volume controller comprising: a first step in which the noise detector detects a noise level in a vehicle interior; a second step in which the command speech detector detects whether it is a command speech period, which is a period of time between detection of a wake-up word from a user's speech sound and the detection of user's command speech; and a third step in which the volume controller sets volume of sounds output to the user based on the noise level when the noise level is not detected during the command speech period, and the volume of the sounds is not set based on the noise level when the noise level is detected during the command speech period.

The invention according to claim 8 is a program which causes a computer to execute an information processing method of an information processing apparatus including a noise detector, a command speech detector, and a volume controller, the program comprising: a first step in which the noise detector detects a noise level in a vehicle interior; a second step in which the command speech detector detects whether it is a command speech period, which is a period of time between detection of a wake-up word from a user's speech sound and the detection of user's command speech; and a third step in which the volume controller sets volume of sounds output to the user based on the noise level when the noise level is not detected during the command speech period, and the volume of the sounds is not set based on the noise level when the noise level is detected during the command speech period.

The invention according to claim 9 is a recording medium, which is computer-readable and non-transitory, containing a program which causes a computer to execute an information processing method of an information processing apparatus including a noise detector, a command speech detector, and a volume controller, the recording medium comprising: a first step in which the noise detector detects a noise level in a vehicle interior; a second step in which the command speech detector detects whether it is a command speech period, which is a period of time between detection of a wake-up word from a user's speech sound and the detection of user's command speech; and a third step in which the volume controller sets volume of sounds output to the user based on the noise level when the noise level is not detected during the command speech period, and the volume of the sounds is not set based on the noise level when the noise level is detected during the command speech period.

BRIEF DESCRIPTION OF DRAWINGS

FIG. 1 illustrates a configuration of an information processing apparatus according to Example 1.

FIG. 2 illustrates a timing chart of a volume controller of the information processing apparatus according to Example 1.

FIG. 4 illustrates a table that the volume controller of the information processing apparatus according to Example 1 refers to when determining volume.

FIG. 6 illustrates a timing chart of a volume controller of the information processing apparatus according to Example 2.

DESCRIPTION OF EMBODIMENT

Figure 3:
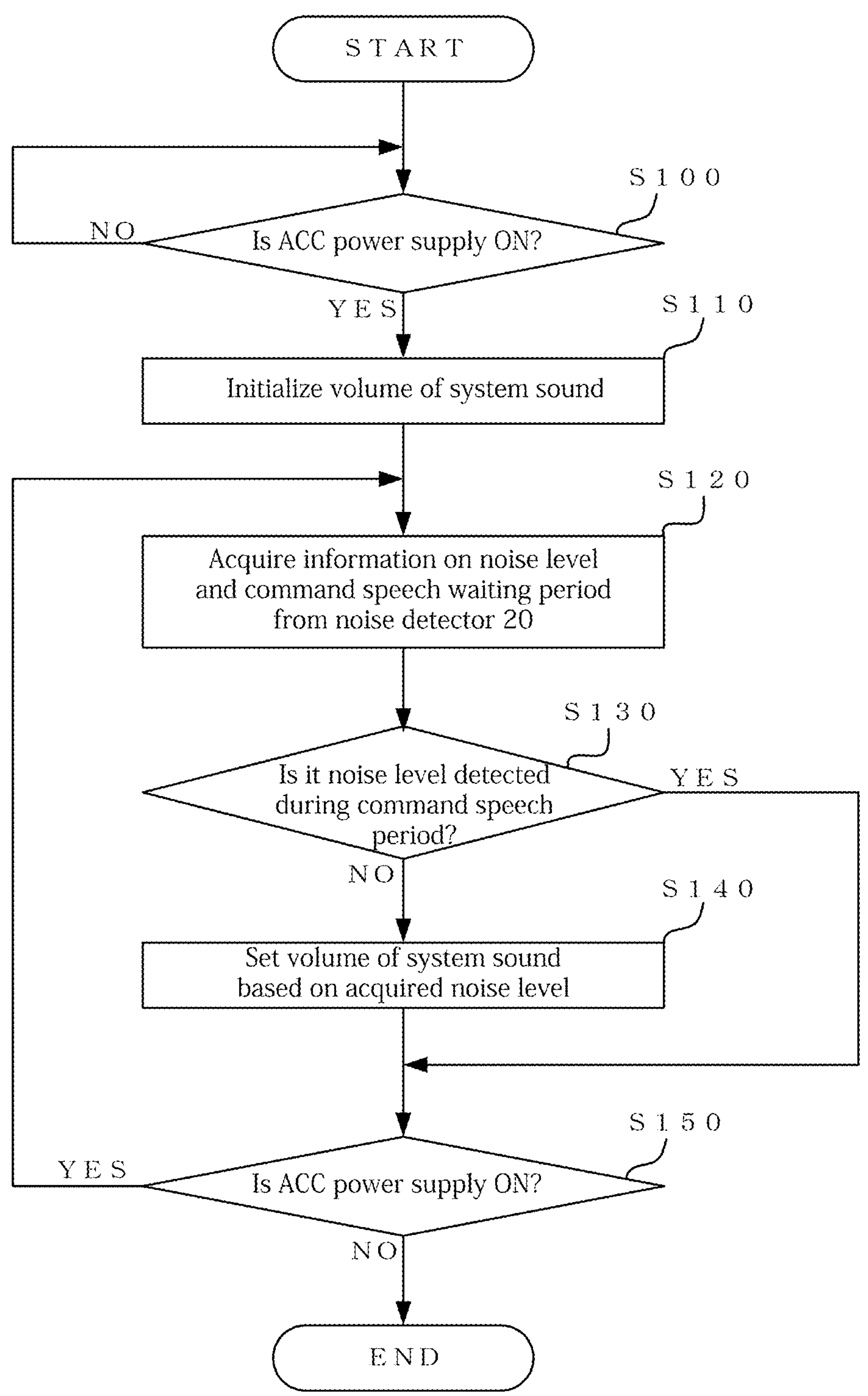
FIG. 3 illustrates a processing flow of the volume controller of the information processing apparatus according to Example 1.

An information processing apparatus according to the present embodiment comprises: a noise detector that detects a noise level in a vehicle interior; a command speech detector that detects whether it is a command speech period, which is a period of time between detection of a wake-up word from a user's speech sound and the detection of user's command speech; and a volume controller that sets volume of sounds output to a user based on the noise level when the noise level is not detected during the command speech period and does not set the volume of the sounds based on the noise level when the noise level is detected during the command speech period.

The noise detector detects loudness of noise (noise level) in a vehicle.

The noise detector transmits a detected noise level and information on whether the noise level has been detected during the command speech period, as described below, to the volume controller.

Specifically, when detecting the noise level, the noise detector checks the information received from the command speech detector, determines whether the noise level has been detected during the command speech period, and transmits the noise level and a determination result to the volume controller.

The command speech detector detects whether current time is the command speech period, which is the period between the detection of the wake-up word from the user's speech sound and the detection of the command speech.

Specifically, the command speech detector detects the wake-up word spoken by the user from collected sounds in the vehicle interior and the command speech following the wake-up word, such as operating instructions to an apparatus or instructions for information retrieval, to detect whether the current time is in the command speech period.

The command speech detector transmits a detection result of whether it is in the command speech period to the noise detector.

The volume controller, when the noise level detected by the noise detector is not detected during the command speech period, sets the volume of the sounds to be output to the user based on the detected noise level.

Here, the sounds to be output to the user includes at least one of a voice guidance sound to guide the user along route to a destination set by the user and the voice guidance sound of recommendation information to the user.

On the other hand, the volume controller does not set the volume of the sounds to be output to the user when the noise level detected by the noise detector is detected during the command speech period.

The noise level detected during the command speech period may be higher because the noise level includes a sound of the command speech spoken by the user.

Therefore, when the noise level detected by the noise detector is detected during the command speech period, the volume controller does not set the volume of the sounds.

This eliminates volume changes in a middle of sound output and unnecessarily loud sound output due to the user's command speech, so that the user can hear the sounds without auditory discomfort and with certainty.

When the noise level detected by the noise detector is not detected during the command speech period, the volume controller controls the volume of the sounds output to the user based on the detected noise level.

In other words, the volume controller sets the volume of the sounds based on the noise level of the sounds that does not include the user's command speech.

As a result, the sounds are output at appropriate volume that matches the noise level in the vehicle, so that the user can hear the sounds without auditory discomfort and with certainty.

Example 1

Figure 2:
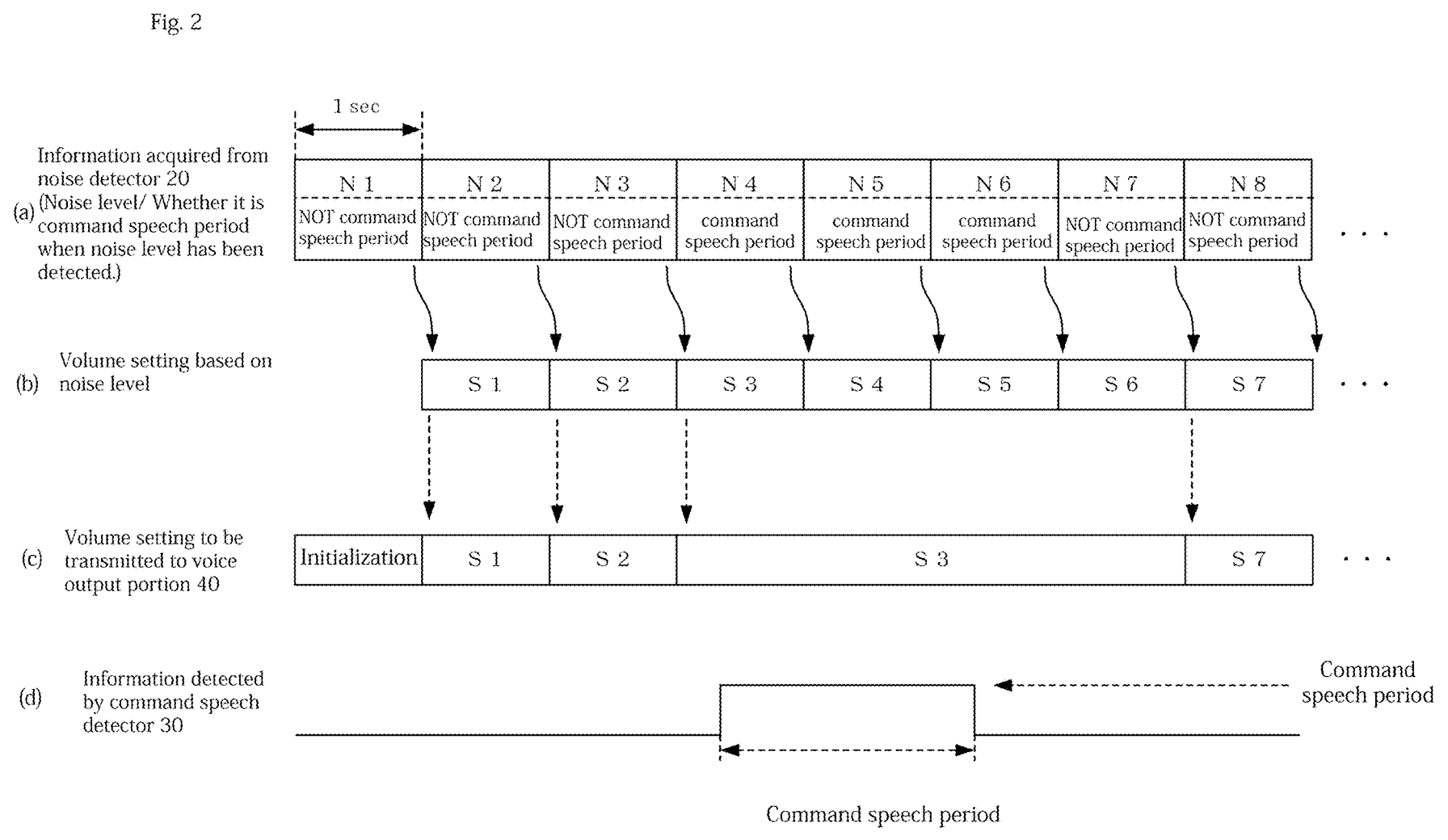

FIG. 1 to FIG. 4 are used to describe an information processing apparatus 1 according to the present example.

Configuration of Information Processing Apparatus 1

FIG. 1 is used to describe the configuration of the information processing apparatus 1 according to the present example.

The information processing apparatus 1 comprises at least a sound collector 10, a noise detector 20, a command speech detector 30, a sound output portion 40, and a volume controller 50.

The sound collector 10, for example, is configured with a microphone, and transmits collected sounds to the noise detector 20 and the command speech detector 30.

Specifically, the sound collector 10 collects sounds using the microphone installed in a vehicle and transmits the sounds to the noise detector 20 and the command speech detector 30.

Examples of the collected sounds by the sound collector 10 include a user's speech sound, an environmental sound around the vehicle, an engine noise, a wind noise, a road noise, an air conditioner operation noise, and voice guidance output from a speaker.

Since the sound collector 10 only needs to collect the sounds generated inside and outside the vehicle as shown in the examples, it may be configured using, for example, the microphone for hands-free communication or the microphone for voice instruction input, which installed in the vehicle.

The noise detector 20 detects a noise level of the collected sounds in the sound collector 10.

For example, the noise detector 20 divides the sounds received from the sound collector 10 into segments at predetermined time intervals (e.g., every second), calculates an average value of the noise level for each segmented sound, and transmits a calculated value to the volume controller 50, which is described further below.

The noise detector 20 also transmits a detected noise level and information on whether the noise level has been detected during a command speech period to the volume controller 50, which is described further below.

Specifically, when detecting the noise level, the noise detector 20 checks the information received from the command speech detector 30 described below, determines whether the noise level has been detected during the command speech period, and transmits the noise level and a determination result together to the volume controller 50.

The command speech detector 30 detects whether it is the command speech period, which is a period of time between detection of a wake-up word from the user's speech sound and the detection of user's command speech.

Specifically, the command speech detector 30 detects the wake-up word spoken by the user from the sounds received from the sound collector 10.

The command speech detector 30 also detects command speech spoken by the user after the wake-up word is detected.

In other words, the command speech detector 30 determines the period from the detection of the wake-up word to the detection of the command speech as the command speech period, and transmits the determination result to the noise detector 20.

The wake-up word is a first word spoken by the user when the user gives instructions to operate the information processing apparatus 1 or to execute information retrieval by voice.

When the wake-up word is spoken, a voice assistant portion of the information processing apparatus 1, which is not illustrated in the figure, is activated, and the voice assistant portion executes processing according to contents of the user's command speech.

As mentioned above, the wake-up word is a short word spoken by the user to activate the voice assistant portion, such as "Hey Pioneer".

Also, the command speech is a specific instruction or other word spoken by the user, after speaking the wake-up word mentioned above, to activate the voice assistant portion, for example, "Tell me tomorrow's weather" or "Tell me the route to my house".

A sound output portion 40 is configured with for example, an amplifier and the speaker, and outputs the sounds to the user.

The sounds output by the sound output portion 40 to the user (hereinafter referred to as "system sounds") includes at least one of the sounds of the voice guidance to guide the user along a route to a destination set by the user (such as advance route information for an intersection at which the user should turn next) and the sound of the voice guidance of recommendation information to the user.

Here, for example, a startup sound of a "ping" or a caution sound output at a start of the voice guidance such as a route guidance can also be exemplified as the system sounds.

A response sound of the voice assistant portion mentioned above can also be exemplified as the system sounds.

The recommendation information mentioned above can be exemplified as information on recommended sightseeing spots and stores in area around a position of own vehicle in traveling and the destination.

Based on a volume setting received from the volume controller 50 described below, the sound output portion 40 outputs the voice guidance received from a navigation controller, not illustrated in the figure, to guide the user along the route to the destination set by the user (such as the advance route information for the intersection at which the user should turn next) and the recommendation information to the user (such as the information on the recommended sightseeing spots and stores in the area around the position of own vehicle in traveling and the destination).

In addition, the sound output portion 40 outputs the voice response to the user's command speech received from the voice assistant portion, not illustrated in the figure, based on the volume setting received from the volume controller 50 described below.

FIG. 2 is used to describe the volume controller 50.

The volume controller 50, when the noise level received from the noise detector 20 is not detected during the command speech period, sets volume of the system sounds based on the noise level and, when the noise level is detected during the command speech period, does not set the volume of the system sounds based on the noise level.

As illustrated in FIG. 2, the volume controller 50 acquires the noise level (N1, N2, . . . ) detected at predetermined intervals (e.g., every 1 second) in the noise detector 20, and determines the volume setting (S1, S2, . . . ) of the system sounds based on the noise level.

When the noise level received from the noise detector 20 is not detected during the command speech period (e.g., N1, N2, N3, N7), the volume controller 50 transmits a volume setting value based on the noise level detected by the noise detector 20 to the sound output portion 40 (e.g., S1, S2, S3, S7).

On the other hand, when the noise level received from the noise detector 20 is detected during the command speech period (N4 to N6), the volume controller 50 does not transmit the volume setting (S4 to S6) based on the noise level received from the noise detector 20 to the sound output portion 40.

In other words, the noise level detected during the command speech period (N4 to N6) may be higher because the noise level includes the sound of the user's command speech.

Therefore, the volume controller 50 does not transmit the volume setting (S4 to S6) based on the noise level (N4 to N6) acquired during the period to the sound output portion 40.

During the period when the volume setting (S4 to S6) is not transmitted to the sound output portion 40, the system sounds is output according to the volume setting (S3) that the volume controller 50 last transmitted to the sound output portion 40.

The details of processing flows of the volume controller 50 are described below.

Processing of Volume Controller 50

The details of the processing flows of the volume controller 50 are described using FIG. 3 and FIG. 4.

As illustrated in FIG. 3, the volume controller 50 determines whether ACC power supply (accessory power supply) of the vehicle is in an ON state (step S100).

When it is determined that the ACC power supply of the vehicle is not in the ON state ("NO" in step S100), processing returns to step S100 and moves to a standby state.

On the other hand, when it is determined that the ACC power supply of the vehicle is in the ON state ("YES" in step S100), the processing moves to step S110.

When it is determined that the ACC power supply of the vehicle is in the ON state ("YES" in step S100), the volume setting in the sound output portion 40 is initialized (step S110).

Immediately after startup of the information processing apparatus 1, because the noise detector 20 has not completed a noise level detection, the volume controller 50 transmits the volume setting selected by the user to the sound output portion 40.

Here, the volume setting selected by the user mentioned above is the volume setting selected by the user while listening to the system sounds in low noise conditions (e.g., engine is in the ON state and the vehicle is in a stopped state).

The volume setting selected by the user is stored in a memory not illustrated in the figure.

The volume controller 50, from the noise detector 20, acquires the detected noise level and the information on whether the noise level has been detected during the command speech period (step S120), and the processing moves to step S130.

The volume controller 50 determines whether the noise level acquired from the noise detector 20 has been detected during the command speech period (step S130).

When it is determined that the noise level acquired from the noise detector 20 has not been detected during the command speech period ("NO" in step S130), the processing moves to step S140.

On the other hand, when it is determined that the noise level acquired from the noise detector 20 has been detected during the command speech period ("YES" in step S130), the processing moves to step S150.

In other words, when it is determined that the noise level acquired from the noise detector 20 is detected during the command speech period, the volume controller 50 does not set volume based on the noise level because the noise level is detected including the sound of the user's command speech.

The volume controller 50, when determining that the noise level acquired from the noise detector 20 is not detected during the command speech period ("NO" in step S130), determines the volume setting of the system sounds based on the acquired noise level, and transmits the volume setting to the sound output portion 40 (step S140).

Here, methods in which the volume controller 50 determines the volume setting of the system sounds based on the noise level acquired from the noise detector 20 are described.

As illustrated in FIG. 4, the volume controller 50 determines the volume setting in the sound output portion 40 based on volume correction amount associated with the noise level acquired from the noise detector 20.

Specifically, the volume controller 50 corrects the volume set in step S110 (the volume of the system sounds set by the user in advance) according to the volume correction amount associated with the noise level.

For example, when the noise level acquired from the noise detector 20 is greater than 60 dB and less than 65 dB, the volume controller 50 transmits the volume setting to the sound output portion 40 where the volume set in step S110 to be +6 dB.

In FIG. 4, a volume correction value is determined by dividing a noise level value acquired from the noise detector 20 into four case levels, but the volume of the system sounds may be controlled by dividing the noise level value into many more case levels.

The volume controller 50 determines whether the ACC power supply (accessory power supply) of the vehicle is in the ON state (step S150).

When it is determined that the ACC power supply of the vehicle is in the ON state ("YES" in step S150), the processing moves to step S120 to continue the processing.

On the other hand, when it is determined that the ACC power supply of the vehicle is not in the ON state ("NO" in step S150), the processing terminates.

The information processing apparatus 1 according to the present example comprises: the noise detector 20 that detects the noise level in a vehicle interior; the command speech detector 30 that detects whether it is the command speech period, which is the period of time between the detection of the wake-up word from the user's speech sound and the detection of the user's command speech; and the volume controller 50 that sets the volume of the sounds (system sounds) output to the user based on the noise level when the noise level is not detected during the command speech period and does not set the volume of the sounds (system sounds) based on the noise level when the noise level is detected during the command speech period.

The noise detector 20 detects loudness of noise (noise level) in the vehicle.

The noise detector 20 transmits the detected noise level and the information on whether the noise level has been detected during the command speech period, to the volume controller 50.

Specifically, the noise detector 20, when detecting the noise level, checks the information received from the command speech detector 30, determines whether the noise level has been detected during the command speech period, and transmits the noise level and the determination result to the volume controller 50.

The command speech detector 30 detects whether current time is the command speech period, which is the period between the detection of the wake-up word from the user's speech sound and the detection of the user's command speech.

Specifically, the command speech detector 30 detects the wake-up word spoken by the user and the command speech following the wake-up word, such as instructions to operate an apparatus or instructions for information retrieval, from the sounds in the vehicle interior collected in the sound collector 10, and detects whether the current time is the command speech period.

The command speech detector 30 transmits a detection result to the noise detector 20 whether it is in the command speech period.

The volume controller 50, when the noise level detected by the noise detector 20 is not detected during the command speech period, sets the volume of the system sounds based on the detected noise level.

On the other hand, when the noise level detected by the noise detector 20 is detected during the command speech period, the volume controller 50 does not set the volume of the system sounds based on the noise level.

The noise level detected during the command speech period includes a sound of the command speech spoken by the user, which may cause the noise level to be higher.

Therefore, when the noise level detected by the noise detector 20 is detected during the command speech period, the volume controller 50 does not set the volume of the sounds.

This eliminates volume changes in a middle of sound output and unnecessarily loud sound output due to the user's command speech, so that the user can hear the sounds without auditory discomfort and with certainty.

When the noise level detected by the noise detector 20 is not detected during the command speech period, the volume controller 50 controls the volume of the system sound based on the detected noise level.

In other words, the volume controller 50 sets the volume of the system sounds based on the noise level of the sounds that does not include the user's command speech.

As a result, the system sounds are output at appropriate volume that matches the noise level in the vehicle, so the user can reliably hear the system sounds without auditory discomfort and with certainty.

The volume controller 50 of the information processing apparatus 1 according to the present example performs volume correction control according to the noise level in the vehicle, so that the system sounds are output at the volume close to that preset by the user, even in noisy conditions.

This allows the user to hear the system sounds reliably even in the noisy conditions.

The volume controller 50 of the information processing apparatus 1 according to the present example transmits the volume setting based on the noise level to the sound output portion 40 even when the system sounds are not output.

Thus, even in the configuration in which the volume controller 50 cannot grasp an output timing of the system sounds such as the voice guidance, the volume setting based on the noise level is always transmitted to the sound output portion 40, so that the user can hear the system sounds without auditory discomfort and with certainty, no matter when the system sounds are output.

The volume controller 50 of the information processing apparatus 1 according to the present example determines the volume setting of the system sounds at a timing when the noise level is received from the noise detector 20, and transmits the volume setting to the sound output portion 40.

When the volume setting is transmitted to the sound output portion 40 at the timing when the system sounds are output, a volume setting value determined based on the noise level needs to be temporarily kept in the memory.

However, since the volume controller 50 does not need to set the volume setting in accordance with the timing at which the system sounds are output, the memory for storing the volume setting can be deleted.

Example 2

Figure 5:
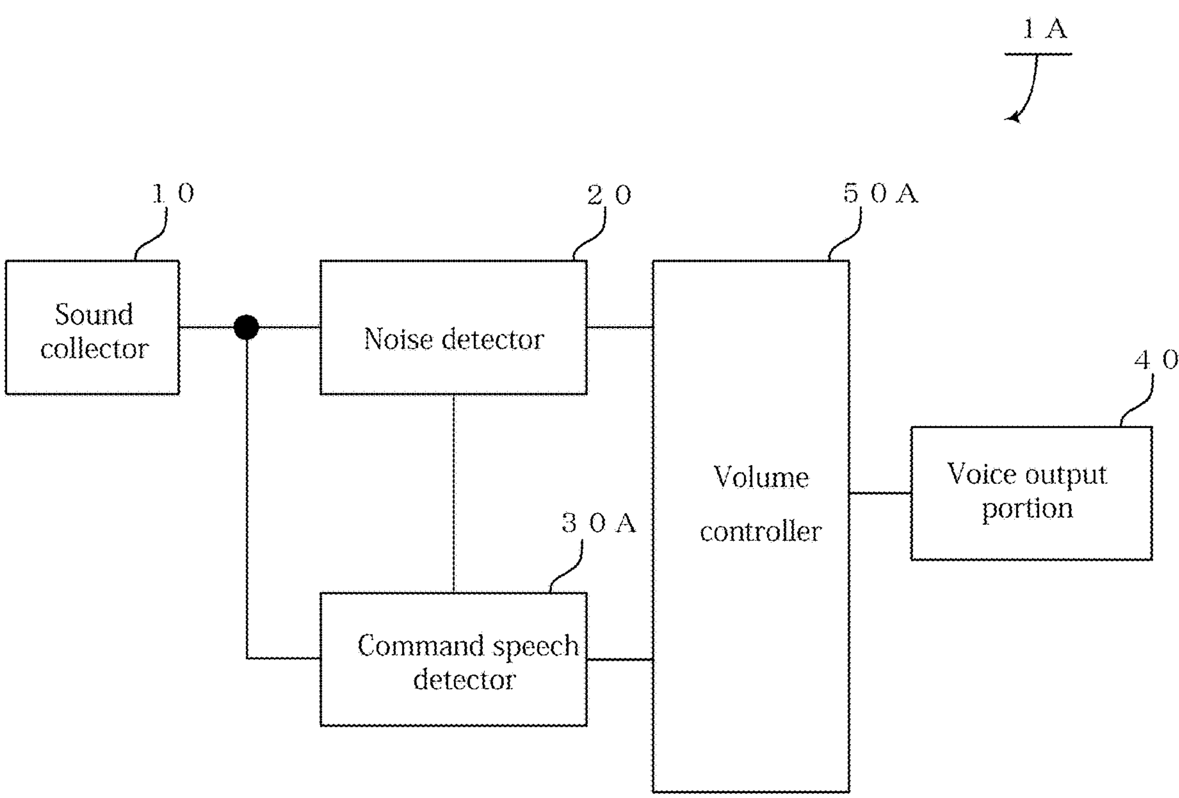
FIG. 5 illustrates a configuration of an information processing apparatus according to Example 2.
Figure 7:
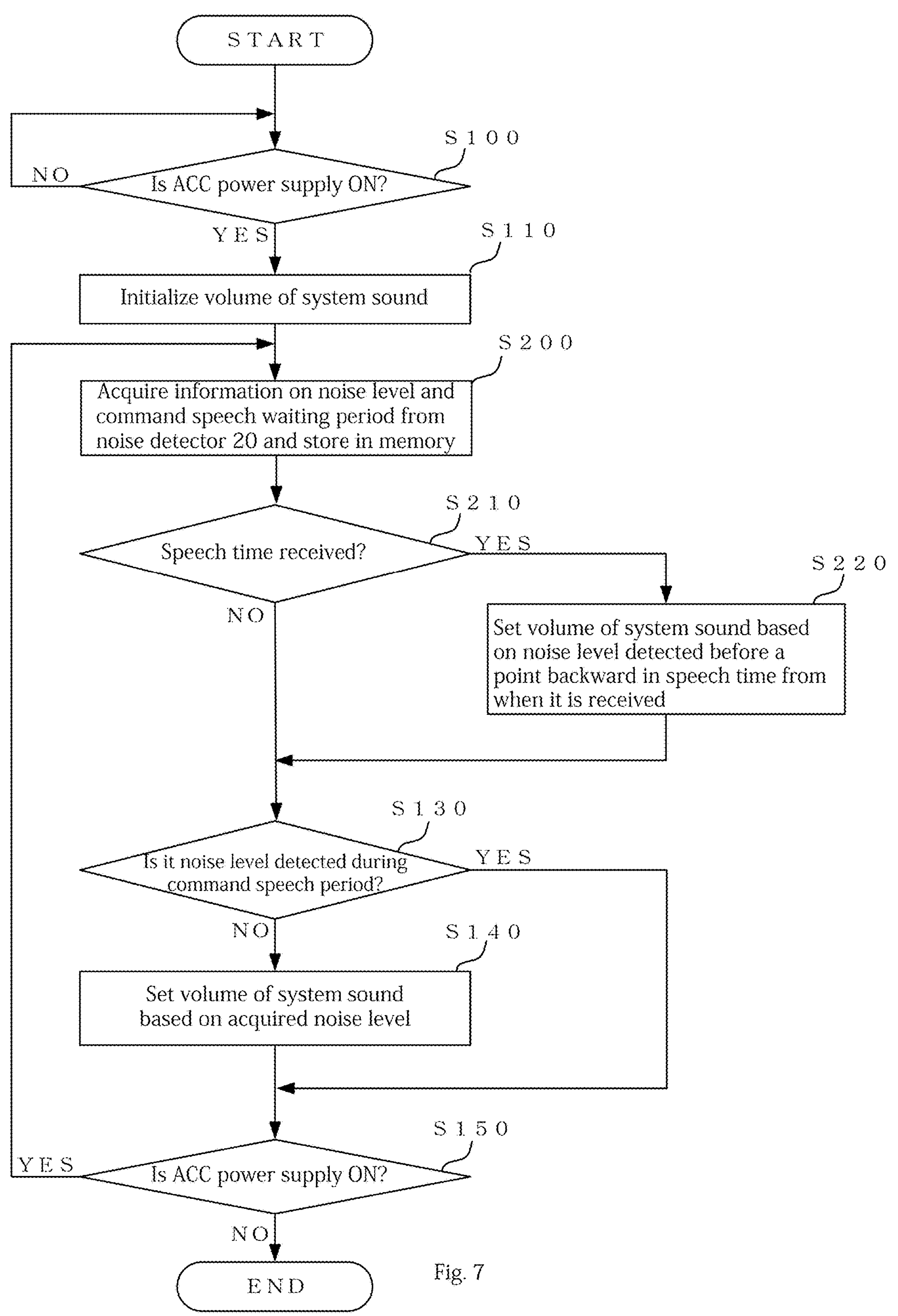
FIG. 7 illustrates a processing flow of the volume controller of the information processing apparatus according to Example 2.

FIG. 5 to FIG. 7 are used to describe an information processing apparatus 1A according to the present example.

Detailed descriptions of components with the same symbols as in Example 1 are omitted, as they have the same functions.

Configuration of Information Processing Apparatus 1A

FIG. 5 is used to describe the configuration of the information processing apparatus 1A according to the present example.

The information processing apparatus 1A comprises at least a sound collector 10, a noise detector 20, a command speech detector 30A, a sound output portion 40, and a volume controller 50A.

The command speech detector 30A detects whether it is a command speech period, which is a period of time between detection of a wake-up word from a user's speech sound and the detection of user's command speech.

Specifically, the command speech detector 30A detects the wake-up word spoken by the user from sounds received from the sound collector 10.

The command speech detector 30A also detects the command speech spoken by the user after detecting the wake-up word.

In other words, the command speech detector 30A determines the period, which is from the detection of the wake-up word to the detection of the command speech, as the command speech period, and transmits a determination result to the noise detector 20.

When detecting the wake-up word, the command speech detector 30A transmits speech time required for the user to speak the wake-up word to the volume controller 50A.

Specifically, the command speech detector 30A, when detecting the wake-up word spoken by the user from the sounds in a vehicle received from the sound collector 10, detects the time required for the user to speak the wake-up word and transmits time information (speech time) to the volume controller 50A.

More specifically, the command speech detector 30A detects the time required for the user (e.g., 850 msec) to speak the wake-up word "Hey Pioneer," which is the wake-up word spoken by the user, and transmits the time information (speech time) to volume controller 50A.

FIG. 6 is used to describe the volume controller 50A.

The volume controller 50A, when a noise level received from the noise detector 20 is not detected during the command speech period, sets volume of system sounds based on the noise level, and when the noise level is detected during the command speech period, does not set the volume of the system sounds based on the noise level.

The volume controller 50A, when receiving the speech time from the command speech detector 30A, sets the volume of the system sounds based on the noise level acquired at least before a point backward in the speech time from that point.

As illustrated in FIG. 6, the volume controller 50A receives the noise level (N1, N2, . . . ) detected at predetermined time intervals (e.g., every 1 second) in the noise detector 20 and determines a volume setting of the system sounds (S1, S2, . . . ) based on the noise level.

When the noise level received from the noise detector 20 is not detected during the command speech period (e.g., N1, N2, N3, N7), the volume controller 50A transmits the volume setting value based on the noise level detected by the noise detector 20 to the sound output portion 40 (e.g., S1, S2, S3, S7)

On the other hand, when the noise level received from the noise detector 20 is detected during the command speech period (N4 to N6), the volume controller 50A does not transmit the volume setting (S4 to S6) based on the noise level received from the noise detector 20 to the sound output portion 40.

In other words, the noise level detected during the command speech period (N4 to N6) may be higher because the noise level is detected including the sound of the user's command speech.

Therefore, the volume controller 50A does not transmit the volume setting (S4 to S6) based on the noise level (N4 to N6) acquired during the period to the sound output portion 40.

As illustrated in FIG. 6(*c*) to FIG. 6(*e*), when the volume controller 50A receives the speech time, which is the information on the time required to speak the wake-up word, from the command speech detector 30A, the volume setting of the system sounds (S2) based on the noise level (N2) acquired before the point backward in the speech time from that point, is transmitted to the sound output portion 40.

Since collected sounds, which are from the point when speech time information is received from the command speech detector 30A to the point backward in the speech time, includes a sound of the wake-up word spoken by the user, the noise level may become higher, so the volume setting of the system sounds based on the noise level before the wake-up word has been spoken, is transmitted to the sound output portion 40.

Specifically, since the noise level (N3) detected by the noise detector 20 is not the noise level detected during the command speech period, but is the noise level detected including the sound of the wake-up word spoken by the user, the volume controller 50A transmits the volume setting (S2) based on the noise level (N2) acquired before the point backward in the speech time to the sound output portion 40.

More specifically, the volume controller 50A reads from a memory, not illustrated in the figure, the noise level acquired before the point backward in the speech time from the point of when the speech time information is received from the command speech detector 30A, and transmits the volume setting of the system sounds (S2) based on that noise level (N2) to the sound output portion 40.

The details of processing flow of the volume controller 50A are described below.

Processing of Volume Controller 50A

FIG. 7 is used to describe the details of the processing flow of the volume controller 50A.

As illustrated in FIG. 7, the volume controller 50A determines whether ACC power supply (accessory power supply) of the vehicle is in an ON state (step S100).

When it is determined that the ACC power supply of the vehicle is not in the ON state ("NO" in step S100), processing returns to step S100 and moves to a standby state.

On the other hand, when it is determined that the ACC power supply of the vehicle is in the ON state ("YES" in step $100), the processing moves to step S110.

When it is determined that the ACC power supply of the vehicle is in the ON state ("YES" in step S100), the volume setting in the sound output portion 40 is initialized (step S110).

The volume controller 50A acquires from the noise detector 20 the detected noise level and information on whether the noise level has been detected during the command speech period and stores the information in a memory not illustrated in the figure (step S200).

Here, the volume controller 50A stores detection information acquired from the noise detector 20 in the memory, not illustrated in the figure, in order to store a history of the detection information received from the noise detector 20 in chronological order.

When storing the detection information, the volume controller 50A adds, for example, the time information for each piece of the information, in order to be able to determine when the information has received from the noise detector 20.

The volume controller 50A determines whether the information on wake-up word speech time has been received from the command speech detector 30A (step S210).

When it is determined that information on the wake-up word speech time has been received from the command speech detector 30A ("YES" in step S210), the processing moves to step S220.

On the other hand, when it is determined that the information on the wake-up word speech time has not been received from the command speech detector 30A ("NO" in step S200), the processing moves to step S130.

When the volume controller 50A determines that the information on the wake-up word speech time has been received from the command speech detector 30A ("YES" in step S210), sets the volume of the system sounds based on the noise level detected before the point backward in the speech time from the point of when the speech time is received (Step S220), and the processing moves to Step S130.

Specifically, the volume controller 50A, when receiving the speech time from the command speech detector 30A, reads from the memory, not illustrated in the figure, the noise level last acquired before the point backward in the speech time from that point, and transmits the volume setting of the system sounds based on the noise level to the sound output portion 40.

The volume controller 50A determines whether the noise level acquired from the noise detector 20 has been detected during the command speech period (step S130).

When it is determined that the noise level acquired from the noise detector 20 has not been detected during the command speech period ("NO" in step S130), the processing moves to step S140.

On the other hand, when it is determined that the noise level acquired from the noise detector 20 has been detected during the command speech period ("YES" in step S130), the processing moves to step S150.

In other words, when it is determined that the noise level acquired from the noise detector 20 is detected during the command speech period, the volume controller 50A does not set the volume based on the noise level because the noise level is detected including the sound of the user's command speech.

The volume controller 50A, when determining that the noise level acquired from the noise detector 20 is not detected during the command speech period ("NO" in step S130), determines the volume setting of the system sounds based on the acquired noise level, and transmits the volume setting to the sound output portion 40 (step S140).

The method of determining the volume setting of the system sounds based on the noise level acquired from the noise detector 20 is the same as in Example 1.

The volume controller 50A determines whether the ACC power supply (accessory power supply) of the vehicle is in the ON state (step S150).

When it is determined that the ACC power supply of the vehicle is in the ON state ("YES" in step S150), the processing moves to step S120 to continue the processing.

On the other hand, when it is determined that the ACC power supply of the vehicle is not in the ON state ("NO" in step S150), the processing terminates.

In the information processing apparatus 1A according to the present example, the command speech detector 30A, when detecting the wake-up word, transmits the speech time required for the user to speak the wake-up word to the volume controller 50A. The volume controller 50A sets the volume of the system sounds based on the noise level acquired at least before the point backward in the speech time from the point of when the speech time has been received from the command speech detector 30A.

The command speech detector 30A, when detecting the wake-up word spoken by the user from the collected sounds in the sound collector 10, detects the speech time required to speak the wake-up word, and transmits the information on the speech time to the volume controller 50A.

When receiving the information on the speech time from the command speech detector 30A, the volume controller 50A sets the volume of the system sounds based on the noise level received from the noise detector 20 at least before the point backward in the speech time from that point.

During the period from the point when the speech time information is received from the command speech detector 30A to the point backward in the speech time, the collected sounds in the sound collector 10 includes the sound of the wake-up word spoken by the user, which may cause the noise level temporarily to become higher.

Thus, the volume controller 50A changes the volume setting based on the noise level acquired before the wake-up word has spoken when the wake-up word is detected by the command speech detector 30A.

In other words, the volume controller 50A sets the volume based on the noise level that does not include the sound of the wake-up word.

This prevents the system sounds from being output unnecessarily loud due to an influence of user's speech of the wake-up word and prevents the volume from changing in a middle of system sounds output, so that the user can hear the system sounds without auditory discomfort and with certainty.

The volume controller 50A of the information processing apparatus 1A according to the present example performs volume correction control according to the noise level in the vehicle, so that the system sounds are output at the volume close to that preset by the user, even in noisy conditions.

This allows the user to hear the system sounds reliably even in the noisy conditions.

The volume controller 50A of the information processing apparatus 1A according to the present example transmits the volume setting based on the noise level to the sound output portion 40 even when the system sounds are not output.

Thus, even in the configuration in which the volume controller 50A cannot grasp an output timing of the system sounds such as voice guidance, the volume setting based on the noise level is always transmitted to the sound output portion 40, so that the user can hear the system sounds without auditory discomfort and with certainty, no matter when the system sounds are output.

The volume controller 50A of the information processing apparatus 1A according to the present example determines the volume setting of the system sounds at a timing when the noise level is received from the noise detector 20, and transmits the volume setting to the sound output portion 40.

When the volume setting is transmitted to the sound output portion 40 at the timing when the system sounds are output, a volume setting value determined based on the noise level needs to be temporarily kept in the memory.

However, since the volume controller 50A does not need to set the volume setting in accordance with the timing at which the system sounds are output, the memory for storing the volume setting can be deleted.

Example 3

Figure 8:
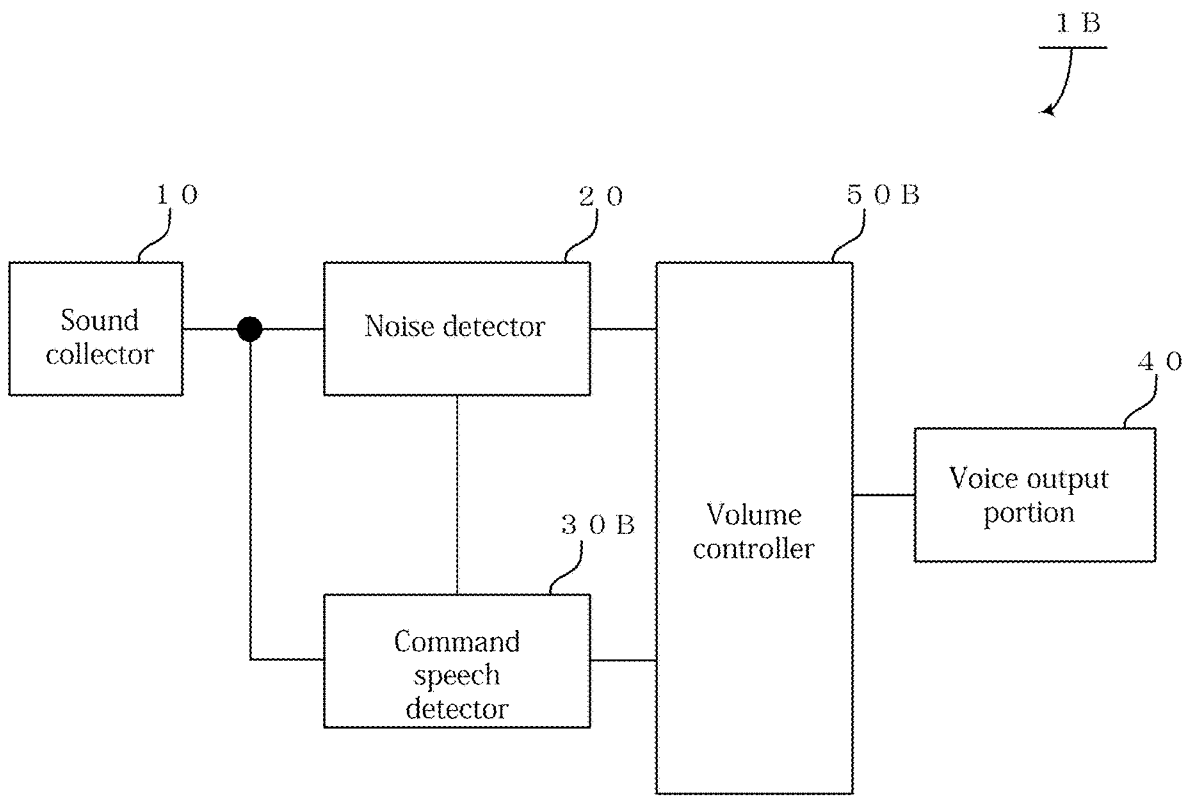
FIG. 8 illustrates a configuration of an information processing apparatus according to Example 3.
Figure 9:
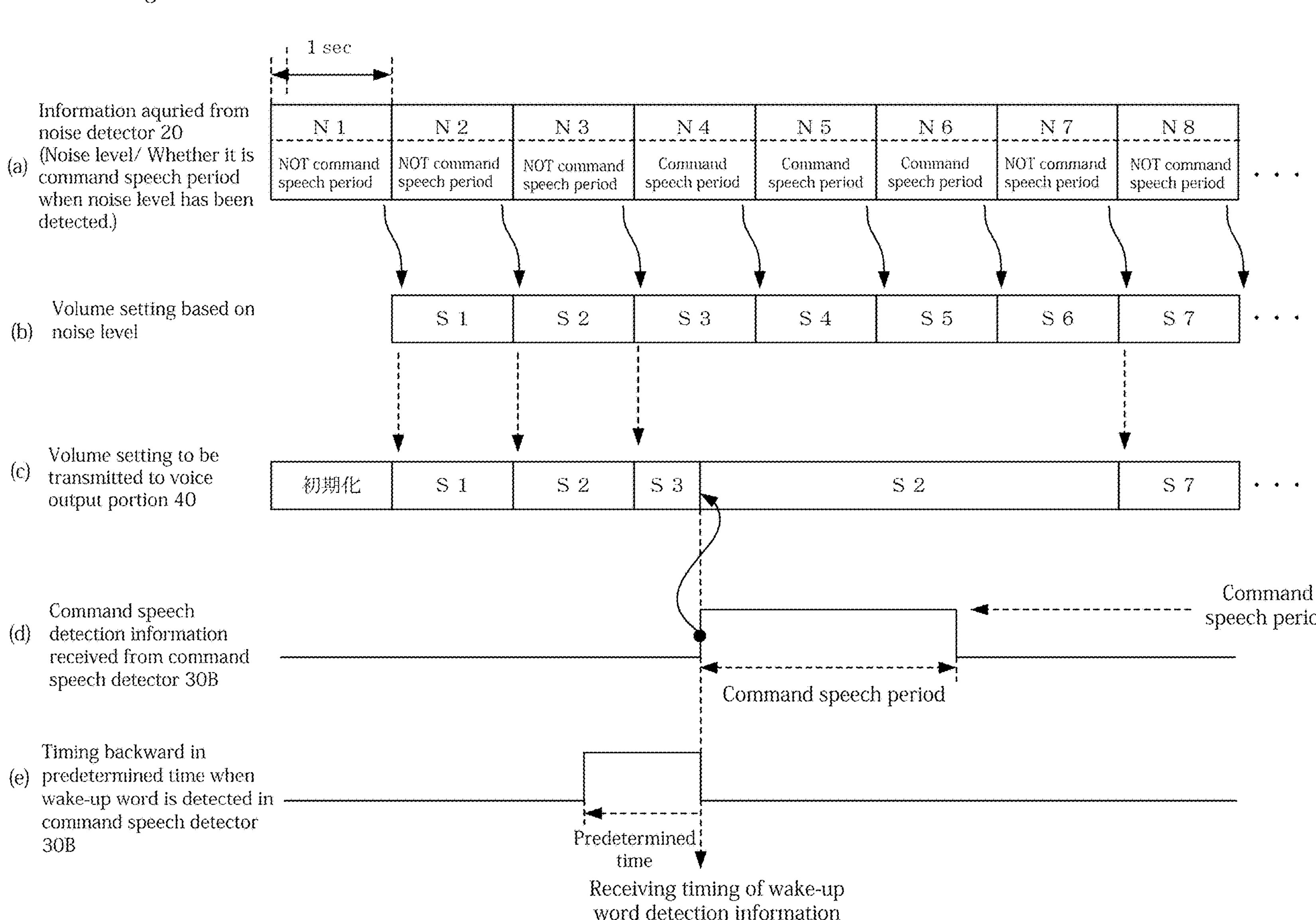
FIG. 9 illustrates a timing chart of a volume controller of the information processing apparatus according to Example 3.
Figure 10:
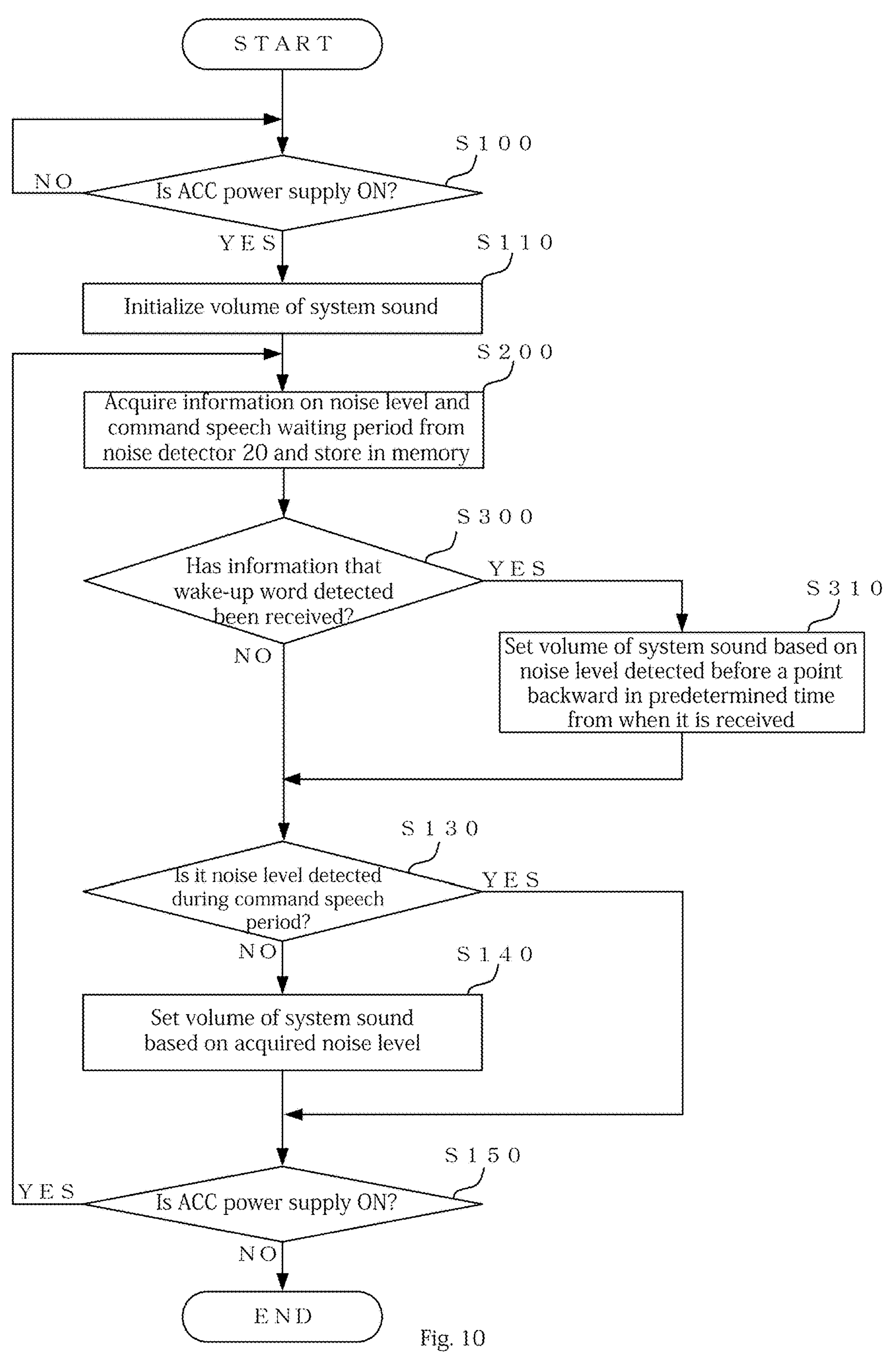
FIG. 10 illustrates a diagram of a processing flow of the volume controller of the information processing apparatus according to Example 3.

FIG. 8 to FIG. 10 are used to describe an information processing apparatus 1B according to the present example. Detailed descriptions of components with the same symbols as in Example 1 and Example 2 are omitted, as they have the same functions.

Configuration of Information Processing Apparatus 1B

FIG. 8 is used to describe the configuration of the information processing apparatus 1B according to the present example.

The information processing apparatus 1B comprises at least a sound collector 10, a noise detector 20, a command speech detector 30B, a sound output portion 40, and a volume controller 50B.

The command speech detector 30B detects whether it is a command speech period, which is a period of time between detection of a wake-up word from a user's speech sound and the detection of user's command speech.

Specifically, the command speech detector 30B detects the wake-up word spoken by the user from sounds received from the sound collector 10.

The command speech detector 30B also detects the command speech spoken by the user after detecting the wake-up word.

In other words, the command speech detector 30B determines the period, which is from the detection of the wake-up word to the detection of the command speech, as the command speech period, and transmits a determination result to the noise detector 20.

Furthermore, the command speech detector 30B, when detecting the wake-up word, transmits information to the volume controller 50B that the wake-up word has been detected.

FIG. 9 is used to describe the volume controller 50B.

The volume controller 50B, when a noise level received from the noise detector 20 is not detected during the command speech period, sets volume of system sounds based on the noise level, and when the noise level is detected during the command speech period, controls not to set the volume of the sounds based on the noise level.

The volume controller 50B, when receiving the information from the command speech detector 30B that the wake-up word has been detected, sets the volume of the system sounds based on the noise level acquired before a point backward in predetermined time from that point.

As illustrated in FIG. 9, the volume controller 50B receives the noise level (N1, N2, . . . ) detected at predetermined time intervals (e.g., every 1 second) in the noise detector 20 and determines the volume setting of the system sounds (S1, S2, . . . ) based on the noise level.

When the noise level received from the noise detector 20 is not detected during the command speech period (e.g., N1, N2, N3, N7), the volume controller 50B transmits the volume setting value based on the noise level detected by the noise detector 20 to the sound output portion 40 (e.g., S1, S2, S3, S7).

On the other hand, when the noise level received from the noise detector 20 is detected during the command speech period (N4 to N6), the volume controller 50B does not transmit the volume setting (S4 to S6) based on the noise level received from the noise detector 20 to the sound output portion 40.

In other words, the noise level detected during the command speech period (N4 to N6) may be higher because the noise level is detected including a sound of the user's command speech.

Therefore, the volume controller 50B does not transmit the volume setting (S4 to S6) based on the noise level (N4 to N6) acquired during the period to the sound output portion 40.

As illustrated in FIG. 9*c* to FIG. 9*e*, volume controller 50B, when receiving the information from command speech detector 30B that the user has spoken the wake-up word, the volume setting of the system sounds (S2) based on the noise level (N2) acquired at least before the point backward in the predetermined time from that point, transmits to the sound output portion 40.

Since collected sounds during the period from the point of when the information that the wake-up word has detected is received from the command speech detector 30B to the point backward at least in the predetermined time includes the sound of the wake-up word spoken by the user, the volume setting of the system sounds (S2) based on the noise level before the wake-up word has spoken is transmitted to the sound output portion 40.

Specifically, since the noise level (N3) detected by the noise detector 20 is not the noise level detected during the command speech period, but is the noise level detected including the sound of the wake-up word spoken by the user, the volume controller 50B transmits the volume setting (S2) based on the noise level (N2) acquired before the point backward in the predetermined time to the sound output portion 40.

More specifically, the volume controller 50B reads from a memory, not illustrated in the figure, the noise level acquired before the point backward in the predetermined time from the point of when the information that the wake-up word has detected has received from the command speech detector 30B, and transmits the volume setting (S2) based on that noise level (N2) to the sound output portion 40.

Here, the predetermined time mentioned above is set to a maximum speech time value that the command speech detector 30B can detect speech as the wake-up word when the user speaks the wake-up word slowly.

The details of a processing flow of the volume controller 50B are described below.

Processing of Volume Controller 50B

FIG. 10 is used to describe the details of the processing flow of the volume controller 50B.

As illustrated in FIG. 10, the volume controller 50B determines whether ACC power supply (accessory power supply) of a vehicle is in an ON state (step S100).

When it is determined that the ACC power supply of the vehicle is not in the ON state ("NO" in step S100), the processing returns to step S100 and moves to a standby state.

On the other hand, when it is determined that the ACC power supply of the vehicle is in the ON state ("YES" in step S100), the processing moves to step S110.

When it is determined that the ACC power supply of the vehicle is in the ON state ("YES" in step S100), the volume setting in the sound output portion 40 is initialized (step S110).

The volume controller 50B acquires from the noise detector 20 the detected noise level and the information on whether the noise level has been detected during the command speech period, and stores the information in the memory not illustrated in the figure (step S200), and the processing moves to step S300.

Here, the volume controller 50B stores the information acquired from the noise detector 20 in the memory, not illustrated in the figure, in order to store a history of detection information received from the noise detector 20 in chronological order.

When storing the information, the volume controller 50B adds, for example, time information for each piece of the information so that, it can be determined when the information has received from the noise detector 20.

The volume controller 50B determines, whether the information, that the wake-up word has been detected, has been received from the command speech detector 30B (step S300).

When it is determined that the information is received, that the wake-up word has been detected from the command speech detector 30B ("YES" in step S300), the processing moves to step S310.

On the other hand, when it is determined that information, that the wake-up word has been detected, has not been received from the command speech detector 30B ("NO" in step S300), the processing moves to step S130.

The volume controller 50B, when determining that it has received information that the wake-up word has been detected from the command speech detector 30B ("YES" in step S300), sets the volume of the system sounds (step S310) based on the noise level detected before the point backward in the predetermined time from the point of when the information that the wake-up word has been detected has received, and the processing moves to step S130.

Specifically, the volume controller 50B, when receiving the information that the wake-up word has been detected, reads from the memory, not illustrated in the figure, the noise level last acquired before the point backward in the predetermined time from that point, and transmits the volume setting of the system sounds based on that noise level to the sound output portion 40.

The volume controller 50B determines whether the noise level acquired from the noise detector 20 has been detected during the command speech period (step S130).

When it is determined that the noise level acquired from the noise detector 20 has not been detected during the command speech period ("NO" in step S130), the processing moves to step S140.

On the other hand, when it is determined that the noise level acquired from the noise detector 20 has been detected during the command speech period ("YES" in step S130), the processing moves to step S150.

In other words, when it is determined that the noise level acquired from the noise detector 20 has been detected during the command speech period, the volume controller 50B controls not to set the volume based on the noise level because the noise level is detected including the sound of the user's command speech.

The volume controller 50B, when determining that the noise level acquired from the noise detector 20 is not detected during the command speech period ("NO" in step S130), determines the volume setting of the system sounds based on the acquired noise level, and transmits the volume setting to the sound output portion 40 (step S140).

The method of determining the volume setting of the system sounds based on the noise level acquired from the noise detector 20 is the same as in Example 1.

The volume controller 50B determines whether the ACC power supply (accessory power supply) of the vehicle is in the ON state (step S150).

When it is determined that the ACC power supply of the vehicle is in the ON state ("YES" in step S150), the processing moves to step S120 to continue the processing.

On the other hand, when it is determined that the ACC power supply of the vehicle is not in the ON state ("NO" in step S150), the processing terminates.

In the information processing apparatus 1B according to the present example, the command speech detector 30B, when detecting the wake-up word, transmits the information that the wake-up word has been detected to the volume controller 50B. The volume controller 50B sets the volume of sounds (system sounds) based on the noise level acquired at least before the point backward in the predetermined time from the point of when the information that the wake-up word has been detected is received from the command speech detector 30B.

The predetermined time is set to maximum speech time for which the command speech detector 30B can detect the wake-up word.

The command speech detector 30B, when detecting the wake-up word spoken by the user from the collected sounds in the sound collector 10, transmits information to the volume controller 50B that the wake-up word has been detected.

During the period from the point when the information that the wake-up word has been detected is received from the command speech detector 30B to the point backward in the predetermined time, the collected sounds in the sound collector 10 includes the sound of the wake-up word spoken by the user, which may cause the noise level to become higher.

Thus, the volume controller 50B, when receiving information from the command speech detector 30B that the wake-up word has been detected, sets the volume of the system sounds based on the noise level last detected in the noise detector 20 at least before the point backward in the predetermined time from that point.

Since the predetermined time mentioned above is set to the maximum speech time that the command speech detector 30B can detect the wake-up word, the volume of the system sounds can be set based on the noise level detected from the speech that does not include the wake-up word spoken by the user.

This prevents the system sounds from being output unnecessarily loudly due to the influence of the user's speech of the wake-up word, so the user can hear the system sounds without auditory discomfort and with certainty.

The volume controller 50B of the information processing apparatus 1B according to the present example performs volume correction control according to the noise level in the vehicle, so that the system sounds are output at the volume close to that preset by the user, even in noisy conditions.

This allows the user to hear the system sounds reliably even in the noisy conditions.

The volume controller 50B of the information processing apparatus 1B according to the present example transmits the volume setting based on the noise level to the sound output portion 40 even when the system sounds are not output.

Thus, even in the configuration in which the volume controller 50B cannot grasp an output timing of the system sounds such as voice guidance, the volume setting based on the noise level is always transmitted to the sound output portion 40, so that the user can hear the system sounds without auditory discomfort and with certainty, no matter when the system sounds are output.

The volume controller 50B of the information processing apparatus 1B according to the present example determines the volume setting of the system sounds at a timing when the noise level is received from the noise detector 20, and transmits the volume setting to the sound output portion 40.

When the volume setting is transmitted to the sound output portion 40 at the timing when the system sounds are output, a volume setting value determined based on the noise level needs to be temporarily kept in the memory.

However, since the volume controller 50B does not need to set the volume setting in accordance with the timing at which the system sounds are output, the memory for storing the volume setting can be deleted.

Other Examples

In the information processing apparatus 1 described above, a detection result of the command speech detector 30 has been transmitted to the noise detector 20, but it may be transmitted to the volume controller 50.

In other words, in the information processing apparatus 1, the noise detector 20 determines whether the noise level has been detected during the command speech period, but the volume controller 50 may receive the detection result from the command speech detector 30 and determine whether the acquired noise level has been detected during the command speech period.

Specifically, the volume controller 50 determines that the noise level received from the noise detector 20 is detected including the sound of user's command speech during the period when the information indicating the command speech period is received from the command speech detector 30.

In addition, the volume controller 50, immediately after the command speech period ends and receives the information from the command speech detector 30 that it is not the command speech period, determines that the noise level received from the noise detector 20 is detected including the sound of the user's command speech.

When the noise level received from the noise detector 20 is determined not to have been detected during the command speech period, the volume controller 50 transmits the volume setting based on the noise level to the sound output portion 40.

On the other hand, when determining that the noise level received from the noise detector 20 has been detected during the command speech period, the volume controller 50 does not transmit the volume setting based on the noise level to the sound output portion 40.

This eliminates volume changes in a middle of sound output and unnecessarily loud sound output due to the user's command speech, so that the user can hear the sounds without auditory discomfort and with certainty.

In the case of having a server execute a voice recognition processing, for example, for executing a voice assistant function in the information processing apparatuses 1, 1A, and 1B, the processing of the command speech detectors 30, 30A, and 30B may be executed on the server.

Specifically, the collected sounds by the sound collector 10 is transferred to the server connected to an internet network, and the server executes the processing of the command speech detectors 30, 30A, and 30B, which is to detect whether it is the command speech period and to detect the speech time of the wake-up word.

The detection result detected at the server is transmitted to the information processing apparatuses 1, 1A, and 1B via the internet network.

The processing of the command speech detectors 30, 30A, and 30B recognizes the wake-up word and the command speech from the user's speech sound, and thus requires a SoC (System on Chip) capable of an extremely high-speed arithmetic processing and resources such as the memory for the arithmetic processing.

In addition, the processing of the voice assistant function requires the SoC capable of the extremely high-speed arithmetic processing in order to recognize the contents of operating instructions to an apparatus or instructions for information retrieval from the user's speech sound and to execute such instructions, and the resources such as the memory for the arithmetic processing.

In other words, similar resources are required to execute the processing of the command speech detectors 30, 30A, and 30B and the processing of the voice assistant function.

In addition, the processing of the command speech detectors 30, 30A, and 30B and the processing of the voice assistant function are both executed based on the collected sounds in the sound collector 10.

In other words, when processing the voice assistant function on the server, a circuit of the command speech detector 30 in the information processing apparatuses 1, 1A, and 1B is deleted, and the collected sounds in the sound collector 10 is transmitted to the server to execute the processing of the command speech detectors 30, 30A, and 30B.

This reduces costs of the information processing apparatuses 1, 1A, and 1B because circuits of the command speech detectors 30, 30A, and 30B can be deleted.

In addition, since the SoC and the memory for example, that execute high-speed arithmetic processing can be deleted, power consumption of the information processing apparatuses 1, 1A, and 1B can be reduced.

In addition, since the circuits of the command speech detectors 30, 30A, and 30B can be deleted, weight of the information processing apparatuses 1, 1A, and 1B can be reduced.

The examples of the present invention have been described above in detail with reference to the drawings. However, specific configuration of the invention is not limited to the examples, and other designs may be included without departing from the scope of the invention.

EXPLANATION OF THE REFERENCE NUMERALS

1: Information processing apparatus
1A: Information processing apparatus
1B: Information processing apparatus
10: Sound collector
20: Noise detector
30: Command speech detector
30A: Command speech detector
30B: Command speech detector
40: Sound output portion
50: Volume controller
50A: Volume controller
50B: Volume controller

The invention claimed is:

1. An information processing apparatus comprising:
a noise detection circuit that divides an audio signal into a plurality of time segments and calculates an average noise level for each of the plurality of time segments to detect noise level;
a command speech detection circuit that detects whether it is a command speech period, which is a period of time between detection of a wake-up word from a user's speech sound and the detection of user's command speech; and
a volume controller including one or more processors, wherein the volume controller
adjusts an audio output level of a voice guidance sound based on the average noise level detected at a time other than during the command speech period;
adjusts the audio output level of the voice guidance sound based on the average noise level acquired before a point backward in a predetermined time from the point of when the wake-up word has been detected, during the command speech period; and
the information processing apparatus outputs the voice guidance sound at the adjusted audio output level.

2. The information processing apparatus according to claim 1,
wherein the volume controller, when the noise level is detected during the command speech period, adjusts the volume of the voice guidance sound based on the average noise level acquired before the point backward in speech time taken by the user to speak the wake-up word, which is the point backward in the predetermined time from the point of when the wake-up word has been detected.

3. The information processing apparatus according to claim 2,
wherein the voice guidance sound guides a route to a destination set by the user.

4. The information processing apparatus according to claim 2,
wherein the voice guidance sound includes recommendation information for the user.

5. The information processing apparatus according to claim 1,
wherein the volume controller, when the noise level is detected during the command speech period, adjusts the volume of the voice guidance sound based on the average noise level acquired before the point backward in maximum speech time during which the command speech-detection circuit can detect the wake-up word, which is the point backward in the predetermined time, from the point of when the wake-up word has been detected.

6. The information processing apparatus according to claim 5,
wherein the voice guidance sound guides a route to a destination set by the user.

7. The information processing apparatus according to claim 5,
wherein the voice guidance sound includes recommendation information for the user.

8. The information processing apparatus according to claim 1, wherein the voice guidance sound guides a route to a destination set by the user.

9. The information processing apparatus according to claim 1,
wherein the voice guidance sound includes recommendation information for the user.

10. An information processing method comprising:
dividing, by an information processing apparatus, an audio signal into a plurality of time segments;
calculating, by the information processing apparatus, an average noise level for each of the plurality of time segments to detect a noise level;
detecting, by the information processing apparatus, whether it is a command speech period, which is a period of time between detection of a wake-up word from a user's speech sound and the detection of user's command speech;
adjusting, by a volume controller including one or more processors of the information processing apparatus, an audio output level of a voice guidance sound based on the average noise level detected at a time other than during the command speech period;
adjusting, by the volume controller, the audio output level of the voice guidance sound based on the average noise level acquired before a point backward in a predetermined time from the point of when the wake-up word has been detected, during the command speech period; and
outputting, by the information processing apparatus, the voice guidance sound at the adjusted audio output level.

11. A non-transitory computer-readable recording medium storing a program causing a computer to execute dividing an audio signal into a plurality of time segments;

calculating an average noise level for each of the plurality of time segments to detect a noise level;

detecting whether it is a command speech period, which is a period of time between detection of a wake-up word from a user's speech sound and the detection of user's command speech;

adjusting an audio output level of a voice guidance sound based on the average noise level at a time other than during the command speech period;

adjusting the audio output level of the voice guidance sound based on the average noise level acquired before a point backward in a predetermined time from the point of when the wake-up word has been detected, during the command speech period; and outputting the voice guidance sound at the adjusted audio output level.

* * * * *